(12) United States Patent
Leman et al.

(10) Patent No.: US 7,347,171 B2
(45) Date of Patent: Mar. 25, 2008

(54) ENGINE VALVE ACTUATOR PROVIDING MILLER CYCLE BENEFITS

(75) Inventors: Scott A. Leman, Eureka, IL (US); David Andrew Pierpont, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/067,050

(22) Filed: Feb. 4, 2002

(65) Prior Publication Data

US 2003/0145810 A1   Aug. 7, 2003

(51) Int. Cl.
*F01L 9/02* (2006.01)

(52) U.S. Cl. .............................. 123/90.12; 123/90.15; 123/90.16

(58) Field of Classification Search ............. 123/90.12, 123/90.15, 90.16, 90.17, 320, 321, 322; 60/567, 60/486
See application file for complete search history.

(56) References Cited

U.S. PATENT DOCUMENTS

| | | | |
|---|---|---|---|
| 3,250,068 A | 5/1966 | Vulliamy | |
| 4,020,809 A | 5/1977 | Kern et al. | |
| 4,033,304 A | 7/1977 | Luria | |
| 4,050,435 A | 9/1977 | Fuller, Jr. et al. | |
| 4,161,166 A | 7/1979 | Roznovsky | |
| 4,180,035 A | 12/1979 | Saiki et al. | |
| 4,206,728 A | 6/1980 | Trenne | |
| 4,423,709 A | 1/1984 | Arrieta | |
| 4,424,790 A | 1/1984 | Curtil | |
| 4,474,008 A | 10/1984 | Sakurai et al. | |
| 4,561,253 A | 12/1985 | Curtil | |
| 4,572,114 A | 2/1986 | Sickler | |
| 4,643,049 A * | 2/1987 | Nishikawa et al. | ........... 74/868 |

(Continued)

FOREIGN PATENT DOCUMENTS

DE    44 40 289 A1    5/1996

(Continued)

OTHER PUBLICATIONS

Edwards et al., "The Potential of a Combined Miller Cycle and Internal EGR Engine for Future Heavy Duty Truck Applications," SAE International, International Congress and Exposition, Feb. 23-26, 1998, pp. 1-19.

(Continued)

*Primary Examiner*—Zelalem Eshete
(74) *Attorney, Agent, or Firm*—Finnegan, Henderson, Farabow, Garrett & Dunner

(57) ABSTRACT

An engine valve actuator providing Miller cycle benefits and a method of operating an engine valve actuator are disclosed. The valve actuator employs a first force to hold an exhaust valve of the engine open during an exhaust stroke and a second, stronger force to hold the exhaust valve open during a compression stroke. The valve actuator may be operated using pressurized fluid adapted to extend an actuator piston through a cylinder. The first force may be derived by a mechanically driven actuator, while the second force may be derived from a high pressure rail of the engine. A low pressure source of the engine may be used to fill the actuator cylinder, with the high pressure rail only being placed into fluid communication with the cylinder when desired. A control valve may be employed to direct either the low pressure or high pressure fluid to the valve actuator cylinder.

14 Claims, 7 Drawing Sheets

U.S. PATENT DOCUMENTS

| | | | |
|---|---|---|---|
| 4,815,423 A | | 3/1989 | Holmer |
| 4,833,971 A | * | 5/1989 | Kubik .......................... 91/29 |
| 5,000,145 A | | 3/1991 | Quenneville |
| 5,012,778 A | | 5/1991 | Pitzi |
| 5,191,867 A | | 3/1993 | Glassey |
| 5,255,641 A | | 10/1993 | Schechter |
| 5,327,858 A | | 7/1994 | Hausknecht |
| 5,333,456 A | | 8/1994 | Bollinger |
| 5,335,633 A | | 8/1994 | Thien |
| 5,363,816 A | * | 11/1994 | Yorita et al. ............. 123/90.12 |
| 5,379,743 A | | 1/1995 | Stokes et al. |
| 5,408,979 A | | 4/1995 | Backlund et al. |
| 5,445,128 A | | 8/1995 | Letang et al. |
| 5,456,222 A | | 10/1995 | Schechter |
| 5,479,890 A | | 1/1996 | Hu et al. |
| 5,520,161 A | | 5/1996 | Klopp |
| 5,546,914 A | | 8/1996 | Scheinert |
| 5,549,095 A | | 8/1996 | Goto et al. |
| 5,564,386 A | | 10/1996 | Korte et al. |
| 5,586,526 A | * | 12/1996 | Lindquist ................. 123/90.12 |
| 5,586,531 A | | 12/1996 | Vittorio |
| 5,611,204 A | | 3/1997 | Radovanovic et al. |
| 5,611,304 A | * | 3/1997 | Shinojima ................ 123/90.15 |
| 5,615,646 A | * | 4/1997 | Feucht .................... 123/90.12 |
| 5,619,965 A | | 4/1997 | Cosma et al. |
| 5,626,116 A | * | 5/1997 | Reedy et al. ............... 123/321 |
| 5,645,030 A | | 7/1997 | Letsche |
| 5,682,854 A | | 11/1997 | Ozawa |
| 5,713,331 A | | 2/1998 | Eisnebacher et al. |
| 5,718,199 A | | 2/1998 | Hu et al. |
| 5,724,939 A | | 3/1998 | Faletti et al. |
| 5,732,678 A | * | 3/1998 | Lindquist et al. ........... 123/446 |
| 5,778,674 A | | 7/1998 | Kimura |
| 5,787,859 A | | 8/1998 | Meistrick et al. |
| 5,809,964 A | | 9/1998 | Meistrick et al. |
| 5,813,231 A | | 9/1998 | Faletti et al. |
| 5,816,216 A | * | 10/1998 | Egashira et al. ............ 123/321 |
| 5,829,397 A | * | 11/1998 | Vorih et al. ............... 123/90.12 |
| 5,839,400 A | * | 11/1998 | Vattaneo ................. 123/90.16 |
| 5,839,453 A | * | 11/1998 | Hu .......................... 123/90.12 |
| 5,927,075 A | | 7/1999 | Khair |
| 5,937,807 A | | 8/1999 | Peters et al. |
| 5,967,115 A | | 10/1999 | Konopka et al. |
| 6,000,374 A | | 12/1999 | Cosma et al. |
| 6,003,316 A | | 12/1999 | Baert et al. |
| 6,006,706 A | * | 12/1999 | Kanzaki .................. 123/90.15 |
| 6,012,424 A | | 1/2000 | Meistrick |
| 6,020,651 A | * | 2/2000 | Nakamura et al. .......... 123/946 |
| 6,026,786 A | | 2/2000 | Groff et al. |
| 6,035,639 A | | 3/2000 | Kolmanovsky et al. |
| 6,035,640 A | | 3/2000 | Kolmanovsky et al. |
| 6,067,800 A | | 5/2000 | Kolmanovsky et al. |
| 6,067,946 A | * | 5/2000 | Bunker et al. ............ 123/90.12 |
| 6,076,353 A | | 6/2000 | Freudenberg et al. |
| 6,082,328 A | | 7/2000 | Meistrick et al. |
| 6,095,127 A | | 8/2000 | Kolmanovsky et al. |
| 6,101,998 A | * | 8/2000 | Tamura et al. .............. 123/295 |
| 6,128,902 A | | 10/2000 | Kolmanovsky et al. |
| 6,135,073 A | * | 10/2000 | Feucht et al. ............. 123/90.12 |
| 6,148,778 A | | 11/2000 | Sturman |
| 6,170,441 B1 | | 1/2001 | Haldeman et al. |
| 6,178,749 B1 | | 1/2001 | Kolmanovsky et al. |
| 6,189,504 B1 | | 2/2001 | Israel et al. |
| 6,209,516 B1 | | 4/2001 | Yamashita |
| 6,237,551 B1 | | 5/2001 | Macor et al. |
| 6,244,257 B1 | | 6/2001 | Hu |
| 6,267,097 B1 | * | 7/2001 | Urushihara et al. ......... 123/305 |
| 6,267,107 B1 | | 7/2001 | Ward |
| 6,273,076 B1 | | 8/2001 | Beck et al. |
| 6,279,550 B1 | | 8/2001 | Bryant |
| 6,301,887 B1 | | 10/2001 | Gorel et al. |
| 6,301,889 B1 | | 10/2001 | Gladden et al. |
| 6,302,076 B1 | | 10/2001 | Bredy |
| 6,435,149 B2 | * | 8/2002 | Moriya et al. ............ 123/90.18 |
| 6,439,195 B1 | * | 8/2002 | Warner ...................... 123/321 |
| 6,467,452 B1 | | 10/2002 | Duffy et al. |
| 6,499,454 B2 | * | 12/2002 | Miyazato et al. ......... 123/90.31 |
| 6,571,765 B2 | | 6/2003 | Kuboshima et al. |
| 6,634,333 B2 | * | 10/2003 | Fujieda et al. .............. 123/308 |
| 6,651,618 B1 | | 11/2003 | Coleman et al. |
| 6,688,280 B2 | | 2/2004 | Weber et al. |
| 6,722,349 B2 | | 4/2004 | Leman et al. |
| 6,732,685 B2 | | 5/2004 | Leman |
| 6,772,742 B2 | | 8/2004 | Lei et al. |
| 2001/0002379 A1 | | 5/2001 | Schechter |
| 2001/0023671 A1 | | 9/2001 | Vorih |
| 2002/0157623 A1 | | 10/2002 | Turner et al. |
| 2003/0145810 A1 | | 8/2003 | Leman et al. |
| 2004/0118118 A1 | | 6/2004 | Weber et al. |
| 2004/0206331 A1 | | 10/2004 | Leman |

FOREIGN PATENT DOCUMENTS

| | | |
|---|---|---|
| DE | 44 43 169 A1 | 6/1996 |
| EP | 0 961 018 A1 | 12/1999 |
| JP | 05106415 A2 | 4/1993 |
| JP | 2000120457 A | 4/2000 |
| JP | 2000145484 A | 5/2000 |
| WO | WO 98/02653 | 1/1998 |
| WO | WO 01/20150 | 3/2001 |

OTHER PUBLICATIONS

Obert, "Internal Combustion Engines and Air Pollution," Based on Internal Combustion Engines, Third Edition, 1973, pp. 612-614.

Challen et al., "Diesel Engine Reference Book, Second Edition," SAE International, 1999, pp. 75, 81, 84, 146, and 263-305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146-150.

Request for *Inter Partes* Reexamination Transmittal Form for 6,688,280, and Attachment to Request for *Inter Partes* Reexamination Transmittal Form, Sep. 17, 2004.

Request for *Inter Partes* Reexamination Transmittal Form for US Patent 6,651,618, and Attachment to Request for *Inter Partes* Reexamination Form, Aug. 27, 2004.

http://www.mazda.com.au/corpora/209.html, Oct. 16, 2001, p. 1-6.

Order Granting/Denying Request for Inter Partes Reexamination for Control No. 95/000,050 dated Dec. 10, 2004; Office Action dated Dec. 10, 2004, in Inter Partes Reexamination for Control No. 95/000,050; Patent Owner's .Response to Office Action, filed Jan. 24, 2005, including Exhibits A and B; Comments of Requester, filed Feb. 23, 2005, including Declaration of Jack A. Ekchian, Ph.D., including Exhibit A; Exhibit B: Dresner et al., "A Review and Classification of Variable Valve Timing Mechanisms", SAE Technical Paper Series, Mar. 1989; and Exhibit C: Dickey et al., "Nox Control in Heavy-Duty Diesel Engines—What is the Limit?" SAE Technical Paper Series, Feb. 1998; and including Declaration of David F. Merrion, including Exhibit A and Exhibit B: Dresner et al., "A Review and Classification of Variable Valve Timing Mechanisms", SAE Technical Paper Series, Mar. 1989.

Order Granting/Denying Request for Inter Partes Reexamination for Control No. 95/000,049 dated Nov. 23, 2004; Office Action in Inter Partes Eeexamination for Control No. 95/000,049 dated Nov. 23, 2004; Patent Owner's Response to Office Action, filed Jan. 24, 2005, including Exhibits A and B; Comments of Requester, filed Feb. 23, 2005, including Declaration of Jack A. Ekchian, Ph.D., including Exhibit A, Exhibit B: Dresner et al., "A Review and Classification of Variable Valve Timing Mechanisms", SAE Technical Paper Series, Mar. 1989; and Exhibit C: Dickey et al., "Nox Control in Heavy-Duty Diesel Engines—What is the Limit?" SAE Technical Paper Series, Feb. 1998; and including Declaration of David F. Merrion, including Exhibit A and Exhibit B: Dresner et al., "A Review and Classification of Variable Valve Timing Mechanisms", SAE Technical Paper Series, Mar. 1989.

Office Action dated Jun. 2, 2003, for U.S. Appl. No. 10/370,852; Amendment filed Jul. 10, 2003.
Office Action dated Jun. 2, 2003, for U.S. Appl. No. 10/143,908; Reply to Office Action filed Sep. 2, 2003.
Co-pending U.S. Appl. No. 10/992,198; Title: Combustion Engine Including Fluidically-Driven Engine Valve Actuator, filed Nov. 19, 2004.
Co-pending U.S. Appl. No. 10/992,137; Title: Combustion Engine Including Fluidically-Controlled Engine Valve Actuator, filed Nov. 19, 2004.
Office Action dated May 28, 2004, for U.S. Appl. No. 10/733,570; Amendment filed Nov. 24, 2004.
Co-pending U.S. Appl. No. 10/933,300; Title: Air and Fuel Supply System for Combustion Engine, filed Sep. 3, 2004.
Co-pending U.S. Appl. No. 10/992,074; Title: Combustion Engine Including Cam Phase-Shifting, filed Nov. 19, 2004.
Co-pending U.S. Appl. No. 10/992,866; Title: Air and Fuel Supply System for Combustion Engine with Particulate Trap, filed Nov. 19, 2004.
Co-pending U.S. Appl. No. 10/992,857; Title: Air and Fuel Supply for Combustion Engine Operating at Optimum Engine Speed, filed Nov. 19, 2004.
Co-pending U.S. Appl. No. 10/992,897; Title: Air and Fuel Supply System for Combustion Engine, filed Nov. 19, 2004.
Co-pending U.S. Appl. No. 10/933,065; Title: Air and Fuel Supply System for Combustion Engine Operating in HCCI Mode, filed Nov. 19, 2004.
Co-pending U.S. Appl. No. 10/992,070; Title: Combustion Engine Including Exhaust Purification with On-Board Ammonia Production, filed Nov. 19, 2004.
Co-pending U.S. Appl. No. 10/992,071; Title: Combustion Engine Including Engine Valve Actuation System, filed Nov. 19, 2004.
Co-pending U.S. Appl. No. 10/992,069; Title: Air and Fuel Supply System for Combustion Engine, filed Nov. 19, 2004.
Co-pending U.S. Appl. No. 10/992,125; Title: Air and Fuel Supply System for a Combustion Engine, filed Nov. 19, 2004.

* cited by examiner

ENGINE VALVE ACTUATOR PROVIDING MILLER CYCLE BENEFITS

TECHNICAL FIELD

This disclosure relates generally to engines and, more particularly, to engine valve actuators.

BACKGROUND

Four stroke, diesel cycle internal combustion engines are well known. One of ordinary skill in the art will readily recognize that such engines operate through four distinct strokes of a piston reciprocating within a cylinder. In an intake stroke, the piston descends within the cylinder while an intake valve is open. Air is thereby able to enter the cylinder through the open intake valve. In a subsequent compression stroke, the piston reverses direction while the intake valve and an exhaust valve are closed, thereby compressing the air. This is followed by a combustion or power stroke wherein the fuel is directly injected into the compressed air and thereby ignited, with the resulting force pushing the piston again in the descending direction while both valves are closed. Finally, the piston reverses direction with the exhaust valve open, thereby pushing the combustion gases out of the cylinder.

One known disadvantage of such engine operation is that significant combustion gas energy is lost during the exhaust blowdown stage. The Miller cycle modifies a traditional Otto or Diesel cycle to, among other things, lower the effective compression ratio, which then increases the ratio of expansion to compression work by the piston and thereby improves mechanical efficiency. For the purpose of discussion, compression ratio is defined herein as a ratio of the engine cylinder capacity when a piston therein is at a bottom dead center position, to the engine cylinder capacity when the piston is at a top dead center position.

The effective compression ratio of an engine can be lowered in at least two ways. One reduces the effective length of the engine compression stroke by opening the engine intake valve for the initial stages of the compression stroke. Since true compression cannot start until the intake valve closes, the compression ratio is necessarily reduced. Another way to reduce the effective compression ratio is to close the intake valve early when still in the later stages of the intake stroke.

While the reduction in effective engine compression ratio will allow for improved mechanical efficiency, it will also tend to reduce the total power output capacity of the engine. For example, if the engine intake valve were to be opened during the initial stages of the compression stroke, a certain volume of air would escape the engine cylinder and thereby not be available for combustion. The Miller cycle therefore may be enhanced by the use of a turbocharger. The turbocharger forces highly compressed air into the cylinder during the compression stroke to make up for such losses through the intake valve. In order to retain the power output capacity and air/fuel ratio of a previously turbocharged engine, the intake air must be compressed to even higher pressure levels when operating the Miller cycle.

A result stemming from the introduction of such turbocharged air, however, is an increase in intake air temperature. Increased intake air temperature leads to reduced intake air density and increased pollutant production such as nitrous oxide ($NO_x$), and engine knock. The highly compressed air from the turbocharger is therefore often cooled prior to introduction to the cylinder, as by an intercooler or the like, in order to maximize air density.

Another difficulty encountered with Miller cycle engine operation, is that the intake valve, or exhaust valve, must be opened and held open against significant forces, such as, for example, forces resulting from inertial and valve spring loads.

The present disclosure is directed to overcoming one or more of the problems or disadvantages associated with the prior art.

SUMMARY

In accordance with one aspect of the disclosure, an engine control system is provided which comprises an engine cylinder, an engine piston reciprocatingly disposed in the engine cylinder, a valve operatively associated with the engine cylinder, a mechanically driven actuator assembly adapted to open the valve, a fluidically driven actuator adapted to open the valve, at least one sensor associated with the engine and adapted to generate an operation signal representative of an engine operation, and a controller adapted to receive the operation signal and transmit a control signal to the fluidically driven actuator and opening the valve based on the operation signal.

In accordance with another aspect of the disclosure, an engine valve actuator is provided which comprises an actuator cylinder having a fluid passage, an actuator piston reciprocatingly mounted in the actuator cylinder, and a control valve operatively associated with the actuator cylinder, the control valve having a housing. The housing includes a low pressure fluid inlet, a high pressure fluid inlet, and a fluid outlet. The control valve further includes a plunger reciprocatingly disposed in the control valve housing and having first and second ends. The plunger is adapted to move from a first position placing the low pressure fluid inlet in communication with the fluid outlet, to a second position placing the high pressure fluid inlet in communication with the fluid outlet. The fluid outlet is in communication with the actuator cylinder fluid passage.

In accordance with another aspect of the disclosure, an engine is provided which comprises an engine cylinder, an engine piston reciprocatingly disposed in the engine cylinder, a valve reciprocatingly disposed in a port extending from the engine cylinder, a first source of pressurized fluid, a second source of pressurized fluid pressurized to a higher level than the first source, and a valve actuator adapted to be in fluid communication with the first and second sources of pressurized fluid. The first source takes up any lash associated with the engine, while the second source causes the valve actuator to open the valve.

In accordance with another aspect of the disclosure, a method of controlling an engine is provided which comprises providing an engine having an engine cylinder, an engine piston reciprocatingly disposed in the engine cylinder, a valve port in fluid communication with the engine cylinder, a valve reciprocatingly disposed in the valve port, a fluidically driven valve actuator operatively associated with the valve, a mechanically driven valve actuator operatively associated with the valve, a source of low pressure fluid, and a source of high pressure fluid, supplying one of the low and high pressure fluid sources to a fluidically driven actuator, opening the valve during the intake and exhaust strokes using a mechanically driven actuator, and opening the valve during the compression stroke using the fluidically driven actuator.

DETAILED DESCRIPTION

Figure 1:
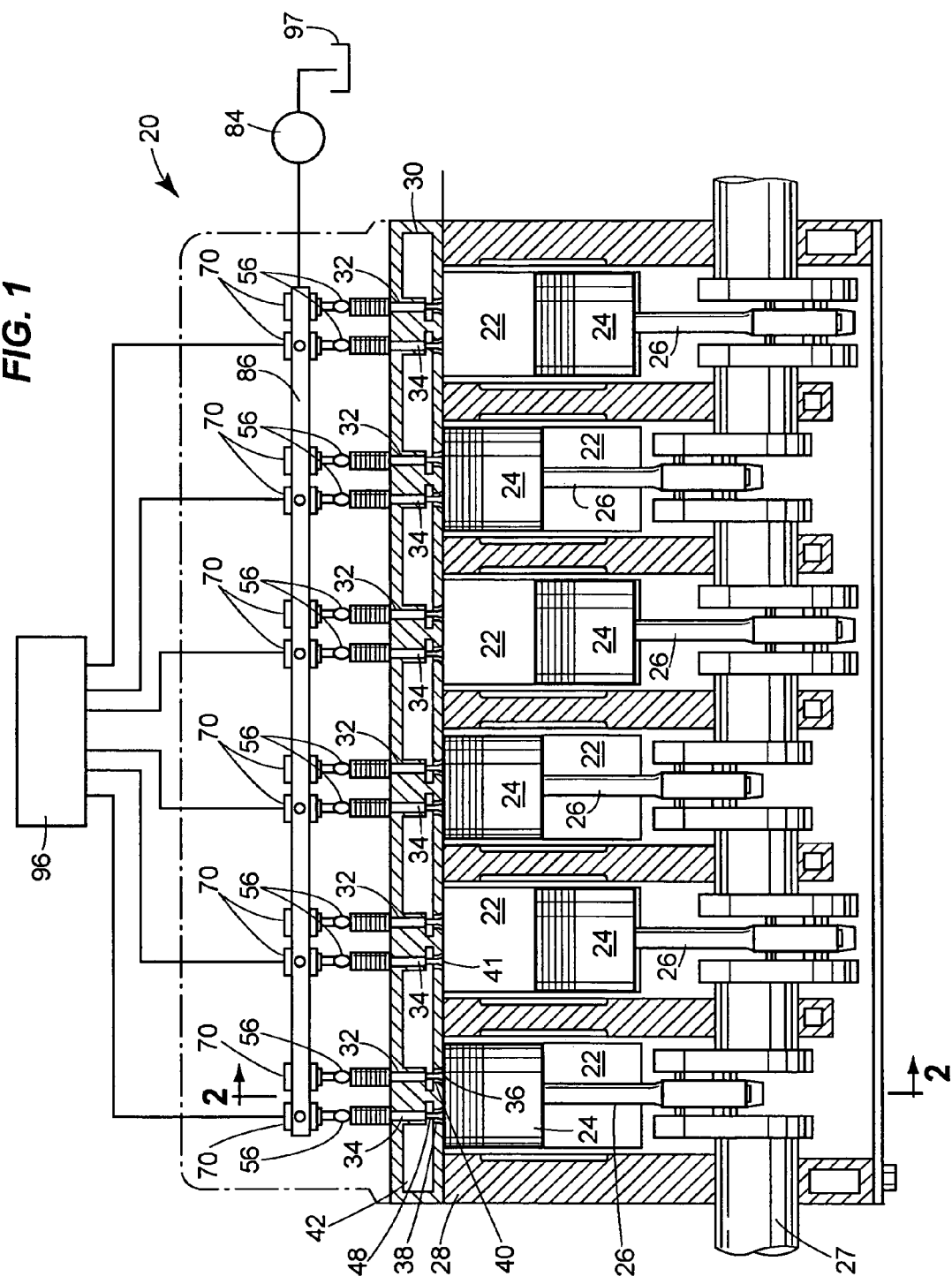
FIG. 1 is a diagrammatic representation of an engine with an engine block thereof shown in cross section.

Referring now to the drawings, and with specific reference to FIG. 1, an engine is generally referred to by reference numeral 20. While the engine 20 is depicted and will be described in further detail herein with reference to a four stroke, internal combustion diesel engine, it is to be understood that the teachings of the invention can be employed in conjunction with other types of engines, such as, for example, Otto cycle, rotary or Wankel engines.

The engine 20 may include a plurality of engine cylinders 22 in each of which is reciprocatingly mounted an engine piston 24. In the depicted embodiment, six such engine cylinders 22 and engine pistons 24 are depicted in aligned fashion, but it is to be understood that a greater or lesser number are possible, and that cylinder orientations other than in-line, such as "V", are possible as well. A connecting rod 26 may be connected to each engine piston 24, and in turn be connected to a crank shaft 27 so as to capitalize on the motion of the cylinder piston 24 to produce useful work in a machine (not shown) with which the engine 20 is associated. Each engine cylinder 24 may be provided within an engine block 28 having a cylinder head 30, and further include an intake valve 32, and an exhaust valve 34.

Referring now to FIGS. 2-5, the cylinder head 30 and exhaust valve 34 are shown in greater detail for one of the cylinders 22. As shown therein, a pair of exhaust ports 38 may be provided in the cylinder head 30 to allow for fluid communication into and out of each engine cylinder 22. Similarly, it is to be understood that while each cylinder 22 in FIG. 1 is depicted with a single intake valve 32, each cylinder 22 is typically provided with a pair of intake valves 32 and intake ports 36. In normal engine operation, air enters the engine cylinder 22 through the intake port 36, while combustion or exhaust gases exit the engine cylinder 22 through the exhaust port 38. An intake valve element 40 may be provided within the intake port 36, while an exhaust valve element 41 may be provided within the exhaust port 38. Each intake port 36 is connected to an intake manifold 42, while each exhaust port 38 is connected to an exhaust manifold 43.

Each of the valve elements 40, 41 may include a valve head 44 from which a valve stem 46 extends. The valve head 44 includes a sealing surface 48 adapted to seal against a valve seat 50 about a perimeter 52 of the valve ports 36, 38. The valve elements 40, 41 further include a bridge 54 adapted to contact the valve stems 46 associated with each engine cylinder 22. A valve spring 56 imparts force between the top of each valve stem 46 and the head 30, thereby biasing the stem 46 away from the head 30 and thus biasing the valve heads 44 into sealing engagement with the corresponding valve seats 50 to close the intake and exhaust valves 32, 34.

Figure 2:
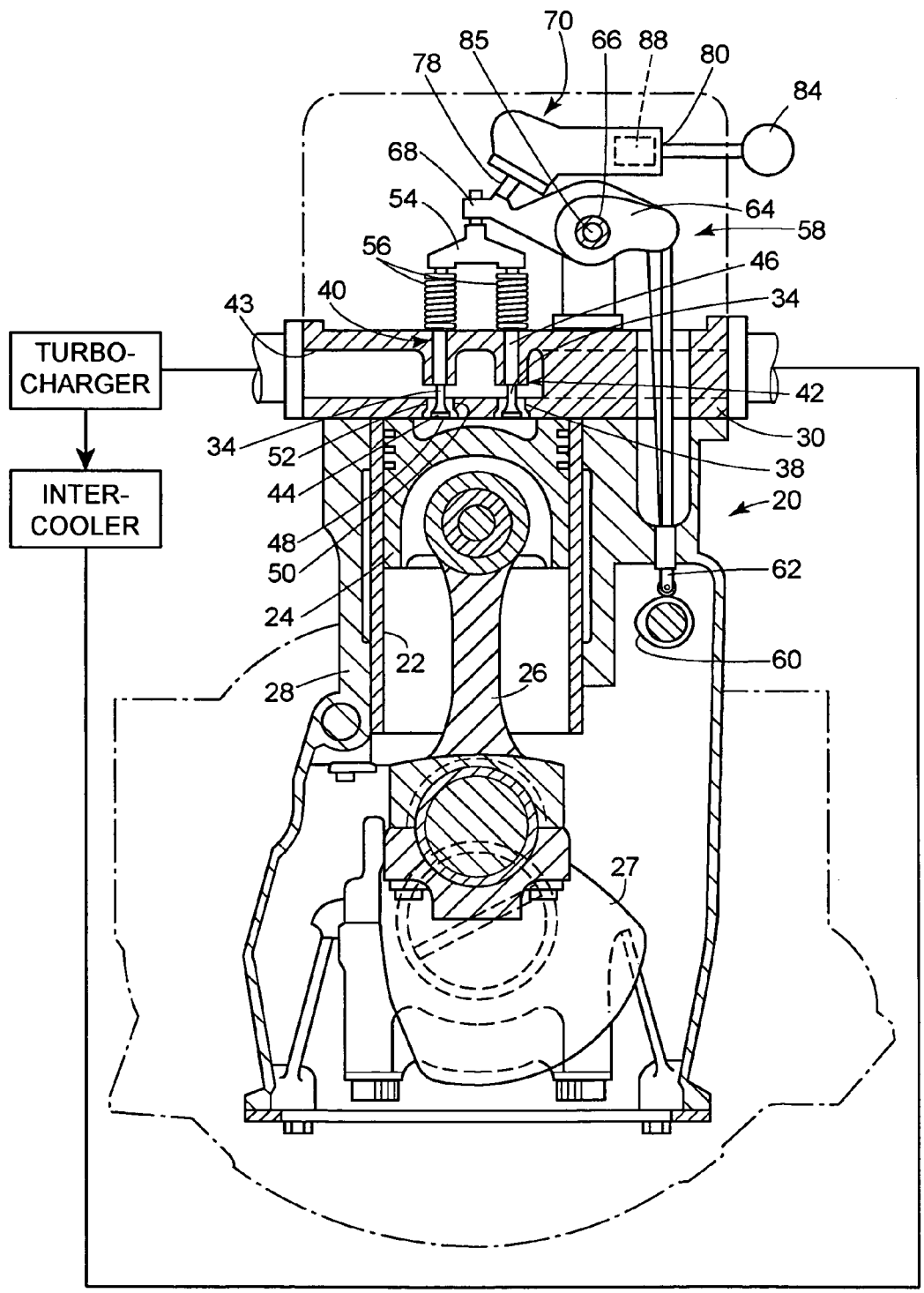
FIG. 2 is a cross-sectional view of the engine of FIG. 1, taken along line 2-2 of FIG. 1.

As shown best in FIG. 2, movement of the valve elements 40, 41 are controlled not only by the springs 56, but by a cam assembly 58 as well. As one of ordinary skill in the art will readily recognize, rotation of a cam 60 periodically causes a push rod 62 to rise, thereby causing a rocker arm 64, contacted thereby, to rotate about a pivot 66. In so doing, an actuator arm 68 is caused to pivot downwardly and thereby open the valve elements 40, 41. Under normal engine operation, the cam 60 imparts sufficient force to the valve stem 46 to overcome the biasing force of the spring 56 and thereby push the valve head 44 away from the valve seat 50, to open the valve.

Figure 3:
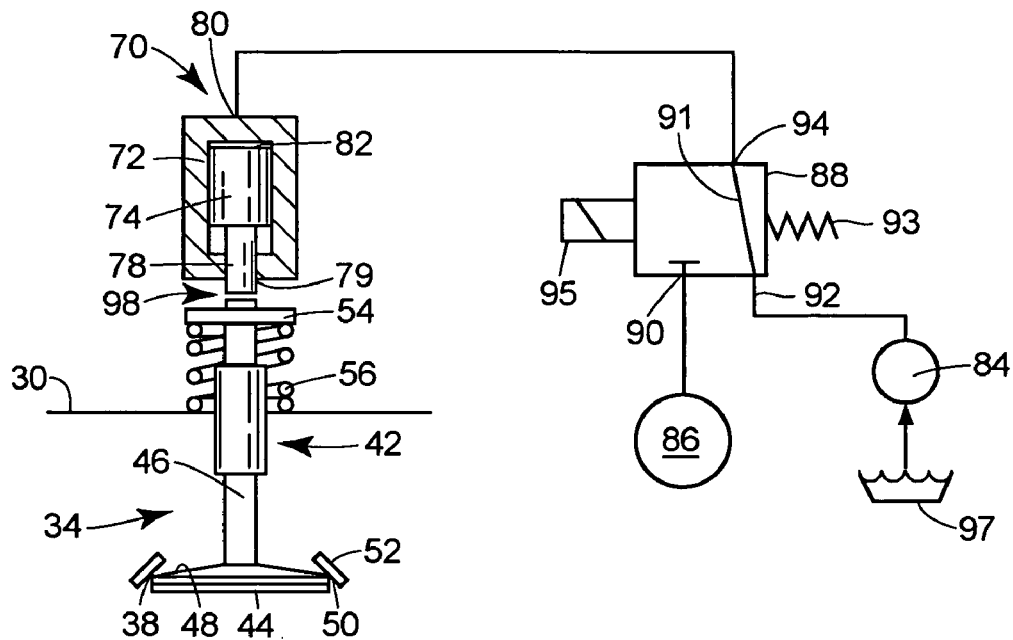
FIG. 3 is a diagrammatic representation of an engine valve actuator depicted in a first position.
Figure 4:
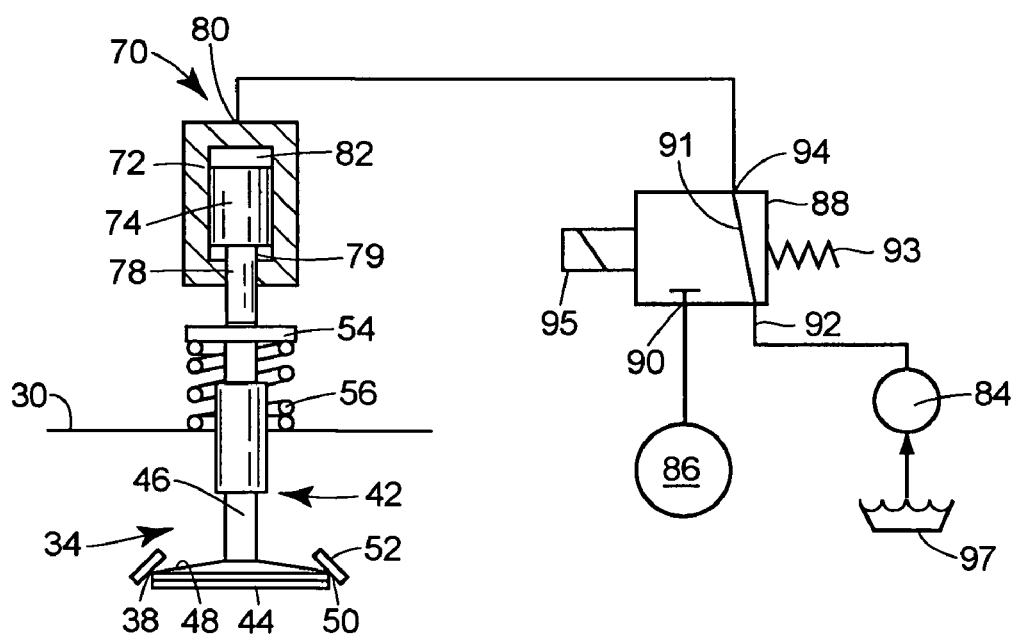
FIG. 4 is a schematic representation of an engine valve actuator constructed in accordance with the teachings of the invention and depicted in a second position.
Figure 5:
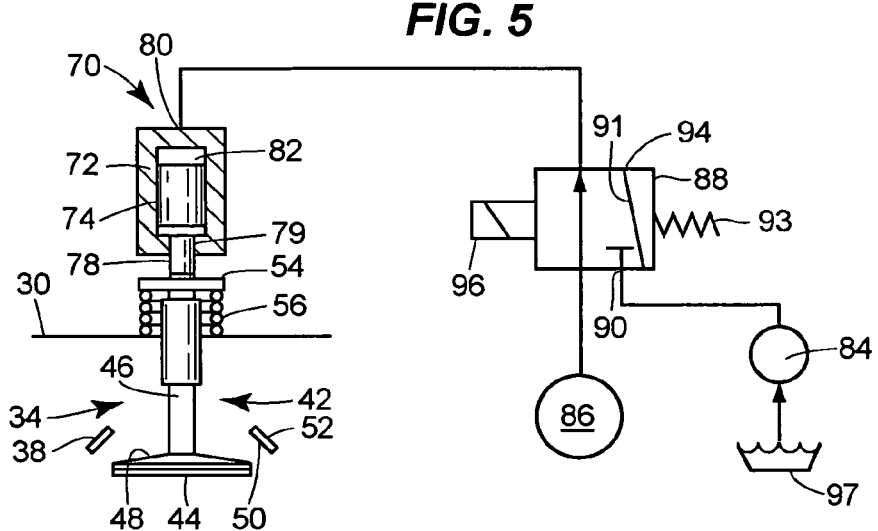
FIG. 5 is a diagrammatic representation of an engine valve actuator depicted in a third position.

In certain modes of engine operation, such as with the Miller cycle operation to be discussed in further detail herein, the valve stems 46 can be alternatively pushed against the springs 56 to thereby open the exhaust valves 34. More specifically, a valve actuator 70 may be used to so open the exhaust valves 34. As shown in FIGS. 3-5, one example of the valve actuator 70 includes an actuator cylinder 72 in which an actuator piston 74 is reciprocatingly disposed. The actuator cylinder 72 may include an opening 79, through which an actuator rod 78 may extend in the direction of the valve stem 46 as well.

The actuator cylinder 72 may also include a port 80 providing access to an actuation chamber 82. The port 80 is adapted to place the actuation chamber 82 into fluid communication with one of a low pressure fluid source 84 or a high pressure fluid source 86. In one embodiment, the low pressure fluid source 84 may be a lubrication oil system of the engine 20 such as that provided to supply lubrication to various moving parts of the engine 20, and the high pressure fluid source 86 may be a high pressure oil rail, such as that provided to supply engine fuel injectors and the like of the engine 20. The low pressure fluid source 84 need not be a lube oil system, but may be any source of fluid on the order of, for example, sixty to ninety pounds per square inch (413.7 KPa to 620.5 KPa), whereas the high pressure fluid source 86 may be any source of fluid on the order of, for example, fifteen hundred to five thousand pounds per square inch (10.34 MPa to 34.4 MPa). Other pressure ranges are certainly possible.

Figure 11:
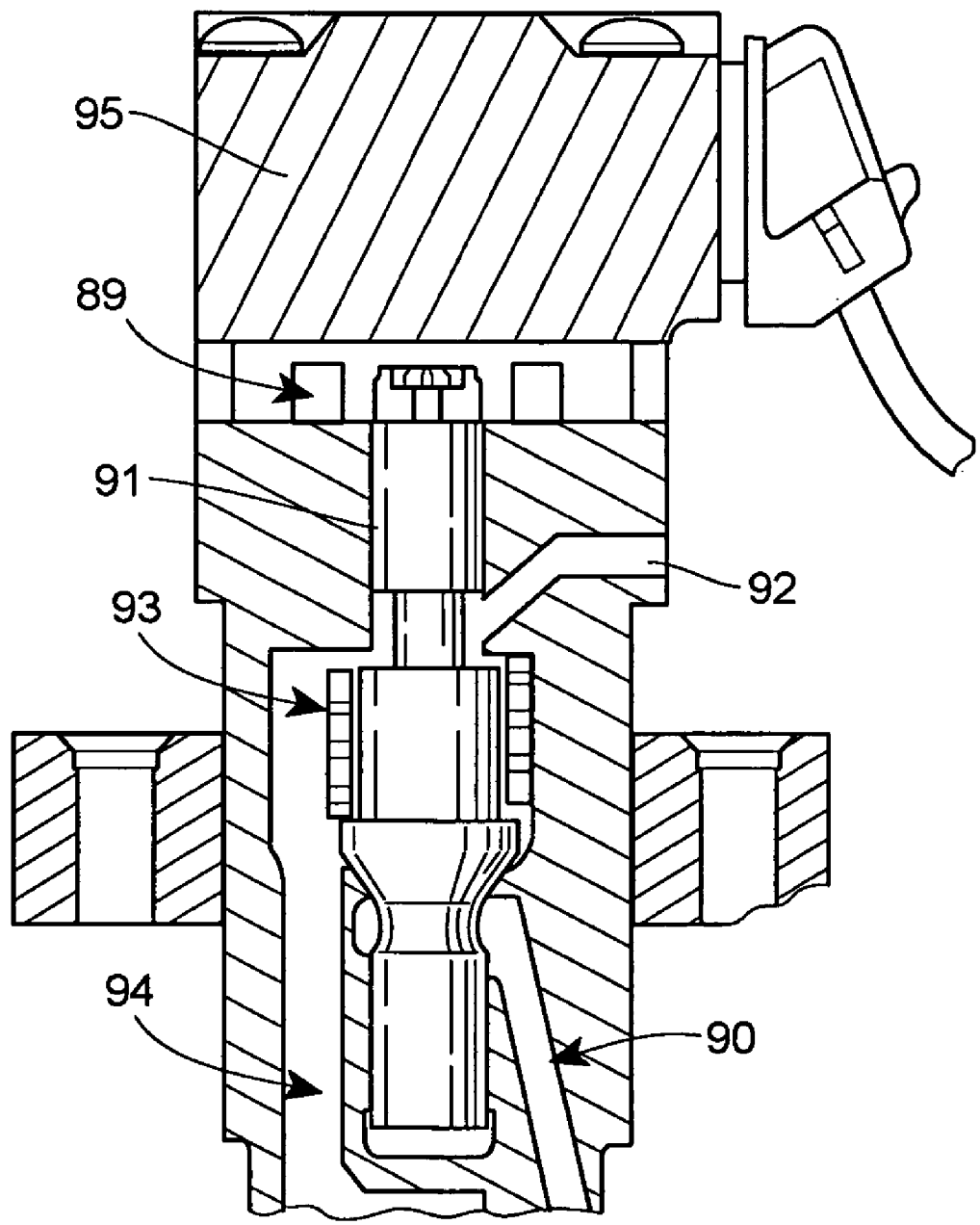
FIG. 11 is a sectional view of a control valve.

Placement of one of the low and high pressure sources 84, 86, respectively, into fluid communication with the actuation chamber 82 via a passage 85 is controlled by a control valve 88. As shown best in FIG. 11, as well as FIGS. 3-5, the control valve 88 may include first and second inlets 90, 92 and a single outlet 94. The control valve 88 may include a control valve plunger or spool 91 biased by a spring 93 into a position connecting the port 80 to the single outlet 94, the first inlet 90, and the low pressure oil source 84. The control valve 88 may be actuated by a solenoid 95 having an armature 89 to connect the port 80 to the single outlet 94, the second inlet 97, and the high pressure oil source 86. The solenoid 95 may itself be actuated upon receipt of a control signal or the like from a main control or processor 96 of the engine 20. Both the low and high pressure sources 84, 86 may be in fluid communication with an oil drain 97, via a check valve or the like. In either event, the actuation chamber 82 is filled with pressurized fluid. With the low pressure fluid, the fluid fills the chamber 82 sufficiently to move the actuator piston 74 so as to take up any lash 98 (FIG. 3) in the system such as that between the actuator rod 78 and the valve stem 46 or between the actuator rod 78 and the rocker arm 64. "Taking up any lash in the system" is defined herein as removing any space existing between components.

In so doing, when Miller cycle operation is desired, the high pressure fluid source 86 can be placed into communication with the chamber 82 and immediately move the actuator piston 74 and the valve stem 46, for example, of the exhaust valve 34, to an open position, thereby greatly reducing the volume of high pressure fluid required and increasing system responsiveness. More specifically, since the actuation chamber 82 is already filled with the low pressure fluid, and the lash 98 is removed from the system, placement of the high pressure source 86 into communication with the chamber 82 quickly actuates the valve stem 46 to open the exhaust valve 34 with little high pressure fluid being used.

It is to be understood that the teachings of the invention could include the use of an actuator, similar to or identical to the actuator 70, in conjunction with the intake valve 32 as well (see FIG. 1), in that the intake valve 32 is the conventional valve to open during Miller cycle operation. However, by providing the actuator 70 proximate the exhaust valve 34, the same actuator 70 can be used in combination with the exhaust valve 34 for other modes of operation including, but not limited to, exhaust gas recirculation and/or compression braking.

In order to allow for proper Miller cycle operation, an external compression device 99 such as a turbocharger (which may, for example, be a variable geometry turbocharger, multiple stage compressor, or series turbocharger each controlled by the main processor 96), as well as a cooling device 100 such as an intercooler, may be provided in fluid communication with the engine cylinders 22. As indicated above, the turbocharger 99 force feeds highly pressurized air into the engine cylinder 22 to account for the losses encountered by having the intake valve 32 open for part of the compression stroke. The intercooler 100 cools the air provided by the turbocharger 99 prior to introduction into the cylinder 22 to maximize intake air density. The results of the highly pressurized, cooled, intake charge air, coupled with the Miller cycle, provides for a significant reduction in combustion temperatures and reduced nitrous oxide (NOx) production, while maintaining engine power.

INDUSTRIAL APPLICABILITY

In operation, the engine 20 can be used in a variety of applications. For example, the engine 20 may be provided on board a prime-mover, vehicle or the like, or any type of machine requiring the provision of mechanical or electrical energy. Such machines may include, but are not limited to, earth moving machines, backhoes, graders, rock crushers, pavers, skid-steer loaders, cranes, automobiles, trucks, and the like.

Figure 6:
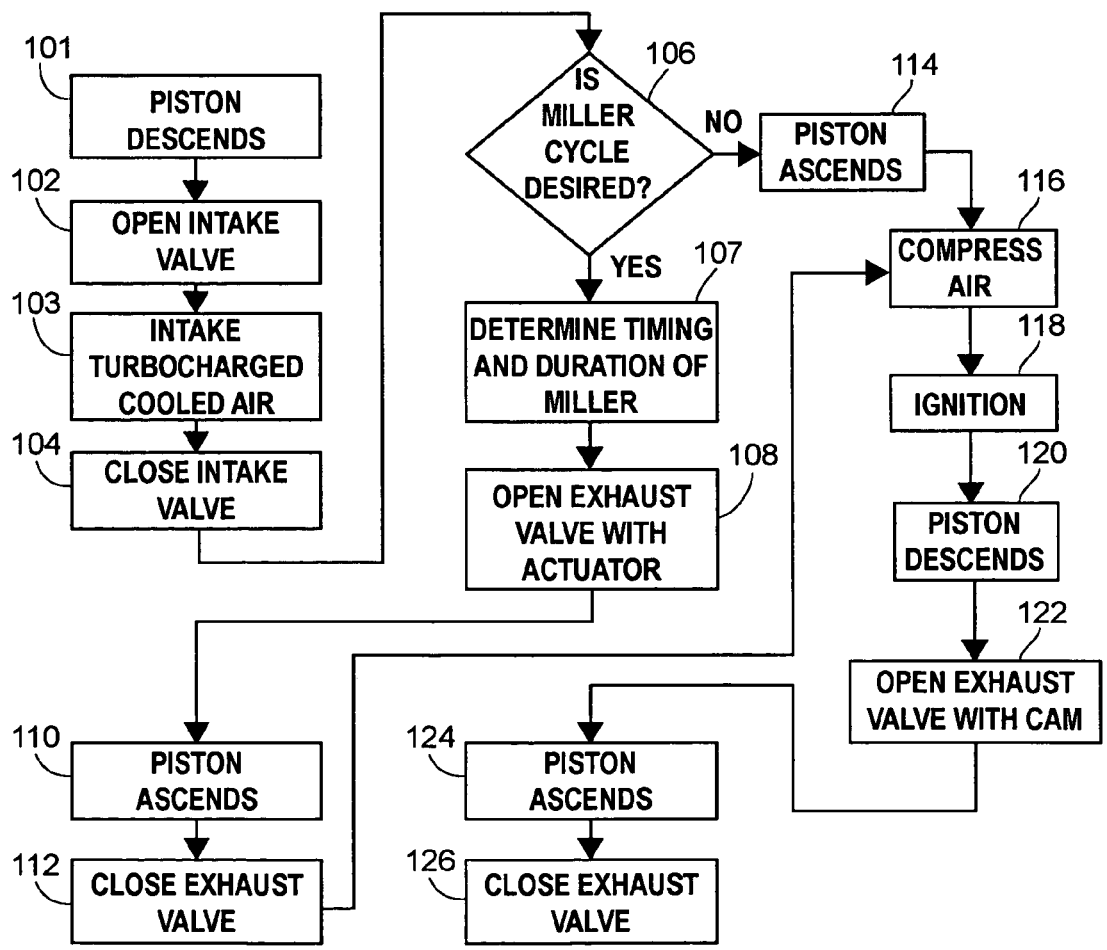
FIG. 6 is a flow chart depicting a sample sequence of steps which may be performed to operate the engine and provide Miller cycle benefits using the exhaust valve.

Referring now to FIG. 6, in conjunction with FIGS. 2-5, the engine 20 can be operated so as to provide Miller cycle operation in the following manner. By way of background, one of ordinary skill in the art will understand that a typical four-stoke, diesel cycle, internal combustion engine operates through four distinct strokes the engine piston 24 through the engine cylinder 22.

Figure 7:
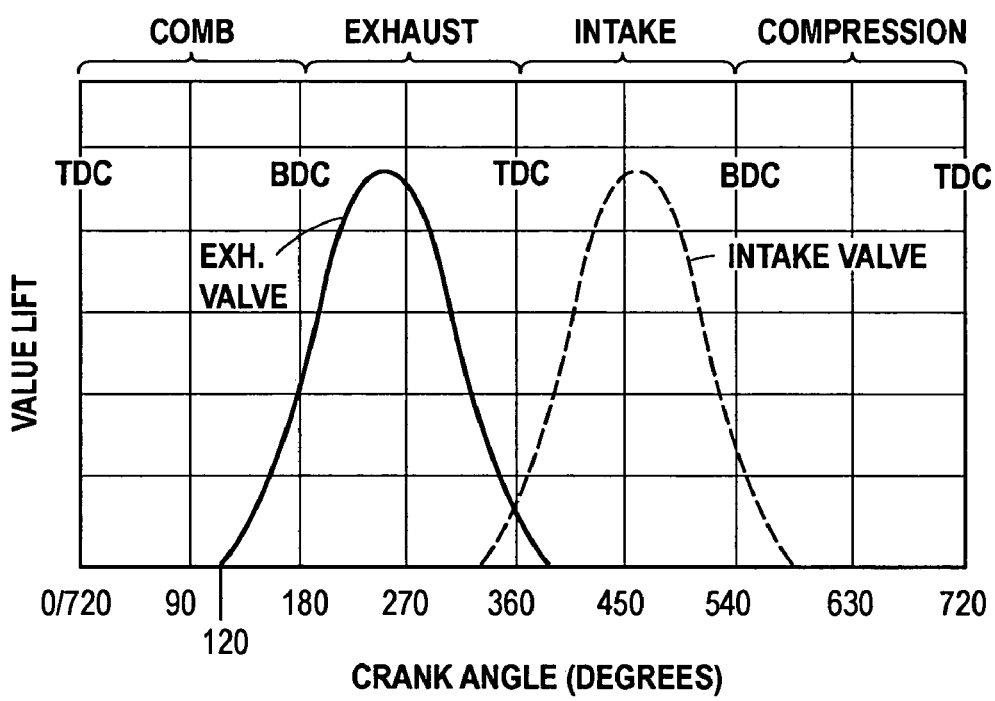
FIG. 7 is a graph plotting valve lift vs. engine crank angle for a typical diesel engine.

In a first or intake stroke, the engine piston 24 descends through the engine cylinder 22 away from the cylinder head 30, while the intake valve 32 is open, as indicated in steps 101 and 102, respectively. In so doing, highly compressed and cooled air can then be injected into the engine cylinder 22, as indicated in a step 103 from the turbocharger 99 and the intercooler 100. The intake valve 32 then closes as indicated by a step 104. Valve timing for such a typical diesel engine is depicted in the graph at FIG. 7.

While a typical four-stroke diesel engine would then proceed to a normal compression stroke, an engine constructed in accordance with the present disclosure to provide Miller cycle benefits does not; it modifies the compression stroke as indicated below. Accordingly, a next step may be to determine if Miller cycle benefits are desired (see step 106). If the answer is affirmative, the duration of the event is determined in a step 107, i.e., how long should exhaust valve 34 be held open, and the exhaust valve 34 is opened using the valve actuator 70 as indicated by a step 108. The engine piston 24 then ascends through the engine cylinder 22 as indicated by a step 110. While the engine piston 24 is ascending, the air within the cylinder is not being significantly compressed in that the exhaust valve 34 is open. Among other benefits, such operation reduces the effective compression ratio of the engine 20.

Figure 8:
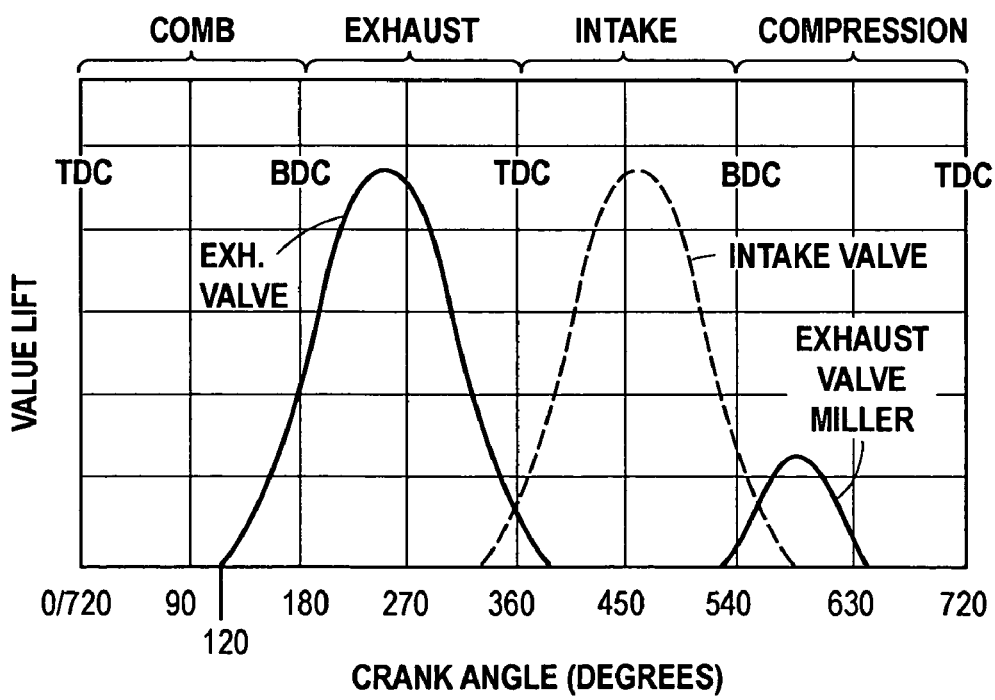
FIG. 8 is a graph plotting valve lift vs. engine crank angle for a diesel engine providing Miller cycle benefits using the exhaust valve.

After a predetermined stroke length (e.g., ninety degrees of a seven hundred and twenty degree four-stroke cycle), the exhaust valve 34 is closed as indicated by a step 112. This may be accomplished as by switching the control valve 88 so as to disconnect the high pressure source 86 from the actuator 70, and thereby allowing the spring 56 to close the valve 34. Such valve timing is depicted in the graph of FIG. 8, wherein the exhaust valve is shown to be opened not only during the exhaust stroke but during the initial stages of the compression stroke.

The remainder of the cycle is the same as any other diesel cycle engine. More specifically, the engine piston 24 ascends with the air within the engine cylinder 22 being compressed by the engine piston 24 to complete a second or compression stroke of the engine 20, as indicated in a steps 114, 116. Fuel is then directly injected into the compressed air and thereby ignited (step 118). The resulting explosion and expanding gases push the engine piston 24 again in a descending direction (as indicated by a step 120) through the engine cylinder 22. During this third or combustion stroke, the intake and exhaust valves 32, 34 remain closed.

In a fourth or exhaust stroke, the engine piston 24 again reverses and ascends through the engine cylinder 22, but with the exhaust valve 34 open, thereby pushing the combustion gases out of the engine cylinder 22. Such steps are indicated in FIG. 6 as steps 122 and 124, respectively. The exhaust valve 34 is then closed as indicated in a step 126, and the cycle repeats. The opening and closing of the exhaust valve 34 during the exhaust stroke may be accomplishing using the cam 60, as opposed to the actuator 70.

Figure 9:
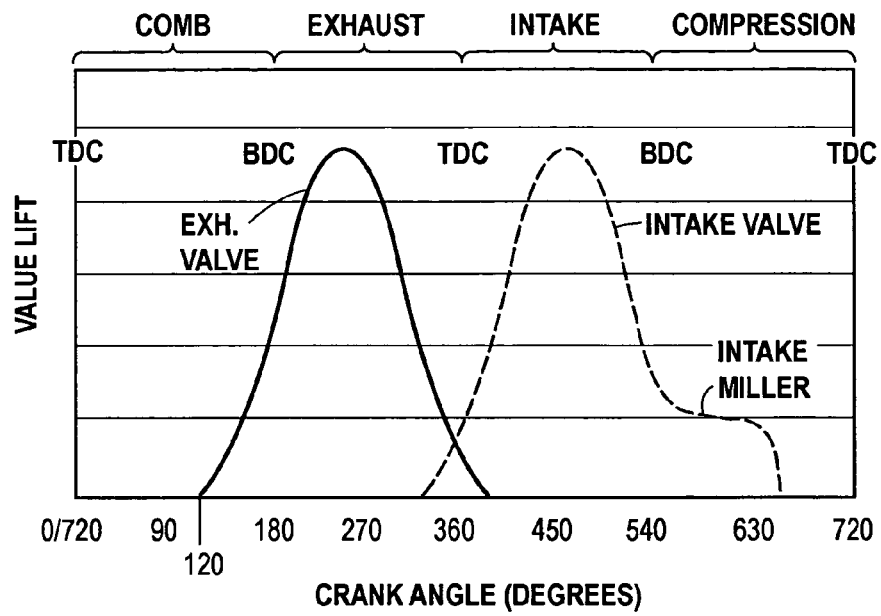
FIG. 9 is a graph plotting valve lift vs. engine crank angle for a diesel engine providing Miller cycle benefits using the intake valve.
Figure 10:
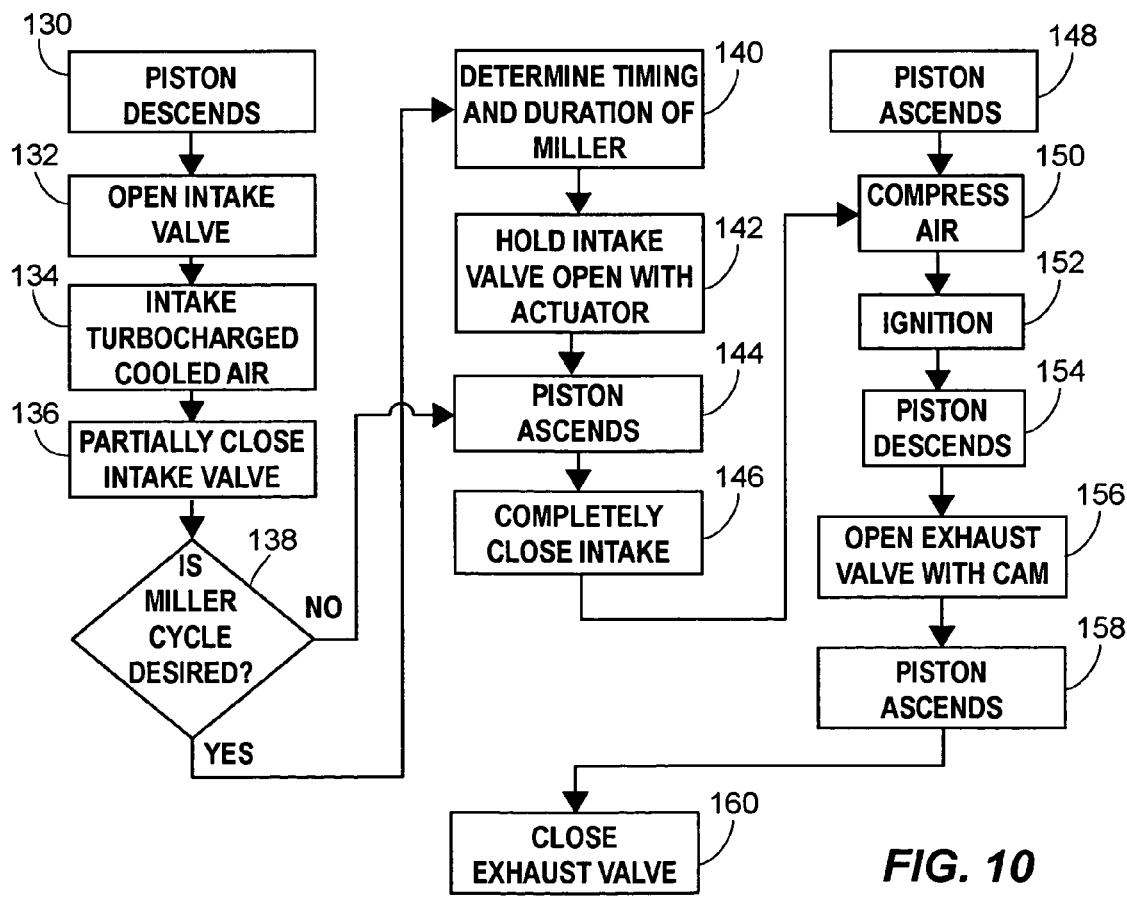
FIG. 10 is a flowchart depicting a sample sequence of steps which may be performed to operate the engine and provide Miller cycle benefits using the intake valve.

Referring again to the step 106, if Miller cycle operation is not desired, the engine 20 functions simply as a normal diesel cycle engine. More specifically, after the intake stroke and closure of the intake valve 32, the engine piston 24 ascends through the engine cylinder 22, as indicated by a step 128. The air within the engine cylinder 22 is accordingly compressed as indicated by the step 116. FIG. 9 depicts, in graphical form, valve timing if Miller cycle benefits are to be achieved using the intake valve 32 instead of the exhaust valve 34. As can be seen, the intake valve 32 is held open or delayed in closing, in the depicted embodiment, for about half of the compression stroke, thereby reducing the compression ratio of the engine 20. The process by which such an engine 20 could function is depicted in flowchart format in FIG. 10. As shown therein, a first step is for the engine piston 24 to descend through the engine cylinder 22, as indicated by step 130. The intake valve 32 is then opened using the mechanically driven actuator or cam assembly 58 as indicated in step 132. In so doing, the turbocharger 99 is thereby able to inject cooled, turbocharged air as indicated in step 134. Continued rotation of the cam assembly 58 allows the spring 56 to partially close the intake valve 32 as indicated in a step 136. However, prior to the intake valve 32 fully closing, Miller cycle benefits can be obtained by extending the closing of the intake valve 32. As shown in FIG. 10, a next step may therefore be to inquire whether Miller cycle is desired as indicated in step 138. If the inquiry is answered in the affirmative, a next step may be to determine the desired duration of the Miller cycle event as indicated in step 140. Once this duration is determined, the intake valve 32 can be held open using the fluidically driven actuator or valve actuator 70 as indicated above. This is indicated by step 142 in FIG. 10. Thereafter, the piston 24 continues to ascend as indicated in step 144, and after the duration determined in step 138, the intake valve 32 is completely closed as indicated in step 146. More specifically, the high pressure fluid can be disconnected from the actuator 70 thereby allowing the spring 56 to fully close the intake valve 32.

After the intake valve 32 is closed, or if the Miller cycle is not desired at all, as indicated in FIG. 10, the remainder of the engine cycle is the same. More specifically, the intake valve 32 is allowed to completely close following the came profile, the engine piston 24 ascends as indicated in step 148, the air is compressed as indicated in step 150, fuel is injected into the compressed air and thereby ignited as indicated in step 152, the engine piston 24 accordingly descends as indicated in step 154, the exhaust valve 34 is opened using the mechanically driven actuator 58 (step 156), the engine piston 24 ascends (step 158), and the exhaust valve 34 is then closed as indicated in step 160.

One of ordinary skill in the art will understand that significant force is required to open the exhaust valve 34 and hold the exhaust valve 34 (and/or intake valve 32) open during the compression stroke due to the ascending engine piston 24 and any inertia and spring 56 loads from the valve mechanism. The actuator 70, when in fluid communication with the high pressure source 86 is able to generate sufficient force against the actuator piston 74 to hold the valve open. Moreover, by directing high pressure fluid to the actuator 70 only when Miller cycle operation is desired, significant efficiencies in engine operation are achieved in that the engine 20 need not continually compress large amounts of fluid to the high pressures needed by the high pressure source 86. An additional benefit is afforded by positioning the actuator 70 proximate the exhaust valve 34. Whereas traditional Miller cycle operation opens the intake valve 32 during the compression stoke, the teachings of the present invention allow for the exhaust valve 34 to be opened during the compression stroke. By providing the actuator 70 proximate the exhaust valve 34, the engine 20 is equipped to operate under other modes of operation as well including, but not limited to, exhaust gas recirculation, using a single actuator 70 for each engine cylinder 22.

Other aspects and features of the present disclosure can be obtained from a study of the drawings, the disclosure, and the appended claims.

What is claimed is:

1. A method of controlling an engine, comprising:
providing an engine having an engine cylinder, an engine piston reciprocatingly disposed in the engine cylinder, a valve port in fluid communication with the engine cylinder, a valve reciprocatingly disposed in the valve port, a fluidically driven valve actuator operatively associated with the valve, a mechanically driven valve actuator operatively associated with the valve, a source of low pressure fluid, and a source of high pressure fluid, the engine piston having intake, compression, power and exhaust strokes;
supplying one of the low and high pressure fluid sources to the fluidically driven actuator;
causing the valve to be open during one of the intake and exhaust strokes using the mechanically driven actuator; and
causing the valve to be open during the compression stroke using the fluidically driven actuator.

2. The method of claim 1, wherein the valve is an intake valve.

3. The method of claim 1, wherein the valve is an exhaust valve.

4. The method of claim 1, wherein causing the valve to be open by using the fluidically driven actuator is performed by connecting the source of high pressure fluid to the fluidically driven actuator.

5. The method of claim 1, wherein the source of low pressure fluid is a lubrication oil system of the engine.

6. The method of claim 1, wherein the source of high pressure fluid is a high pressure rail of the engine.

7. The method of claim 1, wherein the source of low pressure fluid is used to take up any lash in the system.

8. The method of claim 1, wherein the engine further includes a control valve adapted to connect one of the low pressure source and high pressure source to the fluidically driven actuator.

9. The method of claim 8, wherein the engine further includes a processor and a sensor, the sensor being adapted to transmit a signal representative of engine operation to the processor, the processor adapted to transmit a signal to the control valve based on the signal from the sensor.

10. The method of claim 9, wherein the sensor is adapted to monitor one of the group of parameters consisting of engine speed, engine crank angle, temperature, engine load, and fuel delivery.

11. The method of claim 1, further including opening the valve using the mechanically driven actuator.

12. The method of claim 11, wherein the causing the valve to be open using the fluidically driven actuator includes holding the valve open during the compression stroke after the valve is opened using the mechanically driven actuator.

13. The method of claim 1, wherein the causing the valve to be open using the fluidically driven actuator includes opening the valve using the fluidically driven actuator.

14. An engine valve actuator, comprising:
an actuator cylinder having a fluid passage;
an actuator piston reciprocatingly disposed in the actuator cylinder;
a control valve operatively associated with the actuator cylinder, said control valve having a housing, said housing receiving low pressure fluid from a low pressure fluid inlet and receiving high pressure fluid from a high pressure fluid inlet, said housing having a fluid outlet, a plunger having first and second ends reciprocatingly disposed in the housing, the plunger being movable between a first position at which the low pressure fluid inlet is in communication with the fluid outlet, and a second position at which the high pressure fluid inlet is in communication with the fluid outlet, the fluid outlet being in fluid communication with the actuator cylinder fluid passage; and a controller adapted to transmit a control signal to the control valve, wherein the controller is adapted to cause the plunger to be in the second position during a compression stroke of an engine piston.

* * * * *

UNITED STATES PATENT AND TRADEMARK OFFICE
CERTIFICATE OF CORRECTION

PATENT NO. : 7,347,171 B2
APPLICATION NO. : 10/067050
DATED : March 25, 2008
INVENTOR(S) : Leman et al.

It is certified that error appears in the above-identified patent and that said Letters Patent is hereby corrected as shown below:

On the Title Page
Please correct the Other Publications as follows (applicant error):
Page 3, item (56), under "Other Publications", in Column 2, Line 6, delete "10/933,065;" and insert -- 10/993,065; --.

On the Title Page
Please correct the Reference Cited as follows (PTO errors):
Page 2, item (56), under "Other Publications", in Column 2, Line 8, after "Form for" insert -- US Patent --.

On the Title Page
Page 2, item (56), under "Other Publications", in Column 2, Line 18, delete ".Response" and insert -- Response --.

On the Title Page
Page 2, item (56), under "Other Publications", in Column 2, Line 31, delete "Eeexamination" and insert -- Reexamination --.

Please correct the Specification as follows (PTO errors):
Column 4, line 30, delete "altematively" and insert -- alternatively --.

Column 6, line 67 and column 7, line 1-32, delete "FIG. 9 depicts, in . . . . . . . intake valve 32." and insert the same on Col. 7, line 1 as a new paragraph.

Signed and Sealed this

Twenty-first Day of October, 2008

JON W. DUDAS
*Director of the United States Patent and Trademark Office*